United States Patent [19]
Stade

[11] 3,729,178
[45] Apr. 24, 1973

[54] KNEADING ELEMENTS FOR EXTRUDERS

[75] Inventor: Kurt H. Stade, Piscataway, N.J.

[73] Assignee: Union Carbide Corporation, New York, N.Y.

[22] Filed: Nov. 19, 1971

[21] Appl. No.: 200,420

Related U.S. Application Data

[63] Continuation of Ser. No. 014,543, Feb. 26, 1970, abandoned.

[52] U.S. Cl. ................................. 259/192, 259/104
[51] Int. Cl. ................................................ B01f 7/00
[58] Field of Search ................... 259/191, 192, 193, 259/104, 9, 10, 6

[56] References Cited

UNITED STATES PATENTS

| | | | |
|---|---|---|---|
| 2,453,088 | 11/1948 | Dulmage | 259/193 |
| 3,146,493 | 9/1964 | Steinle | 425/6 |
| 3,392,962 | 7/1968 | Fritsch | 259/9 |
| 3,006,029 | 10/1961 | Saxton | 259/191 |
| 3,416,774 | 12/1968 | Fritsch | 259/104 |

Primary Examiner—Robert W. Jenkins
Attorney—Paul A. Rose et al.

[57] ABSTRACT

Screw extruder apparatus is provided for the fluxing and mixing of particulate thermoplastic material which comprises providing, in the kneading elements of the screw-mounted kneading section, a plurality of intermittent, substantially radial grooves each having a width smaller than the smallest dimension of the particulate thermoplastic material to be fluxed and mixed.

5 Claims, 9 Drawing Figures

Patented April 24, 1973

INVENTOR
KURT H. STADE
BY
ATTORNEY

Patented April 24, 1973

INVENTOR
KURT H. STADE
BY
ATTORNEY

Patented April 24, 1973

INVENTOR
KURT H. STADE
BY
ATTORNEY

Patented April 24, 1973

INVENTOR
KURT H. STADE
BY
ATTORNEY

KNEADING ELEMENTS FOR EXTRUDERS

This application is a continuation of application Ser. No. 014,543, filed Feb. 26, 1970, now abandoned.

FIELD OF INVENTION

This invention relates to improved kneading elements for extruders.

THE PRIOR ART

The use of kneading blocks and kneading discs, in both single and twin-screw extruders, has long been known in the art of fluxing and mixing particulate thermoplastic materials. For example, it has long been known in the art, such as in U.S. Pat. No. 2,485,854, to employ eccentrically aligned kneading discs or blocks in the kneading section of a screw extruder. Similarly, differing shaped cross-sections are obtained for kneading blocks employed with double-flight screw extruders.

A further variation is obtained in the kneading elements of triple-flight screw extruders, wherein curved, triangularly-shaped cross-sectional kneading elements are provided. Such apparatus is exemplified by that shown and described in U.S. Pat. No. 3,146,493. The three, sequential, schematic sectional views of FIG. 3 show the sequential flow of thermoplastic material which the coacting twin kneading elements provide.

Extruders employing such kneading elements are commercially available for the continuous compounding of thermoplastic materials, e.g., polystyrene, polysulfone, ABS, and the like.

The function of the kneading elements is to generate high shear in the thermoplastic material being processed in order to promote the conversion of solid resin particles into a homogeneous melt in an expedient manner. This is mainly accomplished through high shear resulting from the displacement of the resin which is confined in the free space between the two rotating extruder screws and the stationary barrel. Dependent upon the angular position of the screws, shear forces vary in magnitude and direction so that only part of the material being processed undergoes maximum shear.

In addition to the circumferential kneading action, there is a movement of the material in the direction of the extruder axis. The axial velocity in a given extruder is determined by the mass flow rate. Often, during extruder operations, a critical throughput rate is attained at which an increasing number of unmelted particles appear in the extrudate. This can be explained by the face that at higher extruder rates, the axial velocity becomes high enough to permit some particles to pass through the kneading section without exposure to maximum shear.

Efforts have been directed toward increasing the critical throughput rate in order to improve the economics of claims. extrusion process. Heretofore, the use of longer or additional kneading sections alleviates the problem of incomplete melting, but leads to higher extrusion temperatures. In case where low extrudate temperature is mandatory, only low throughput rates can be maintained in order to prevent thermal degradation of the material.

It is a prime object of the present invention to provide improved kneading elements for extruders employed for the fluxing and mixing of thermoplastic material, whereby better fluxing and improved mixing performance is obtained.

Other aims and objectives of the present invention will be apparent from the following description and appended claims.

Figure 1:
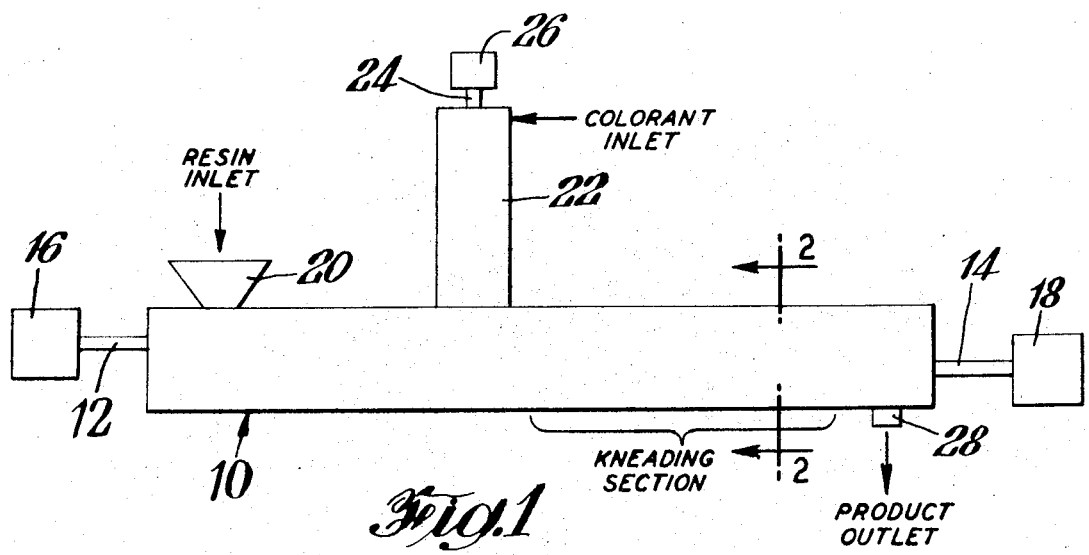
FIG. 1 is a schematic view of screen extruder apparatus for the fluxing and mixing of particulate thermoplastic material.
Figure 3:
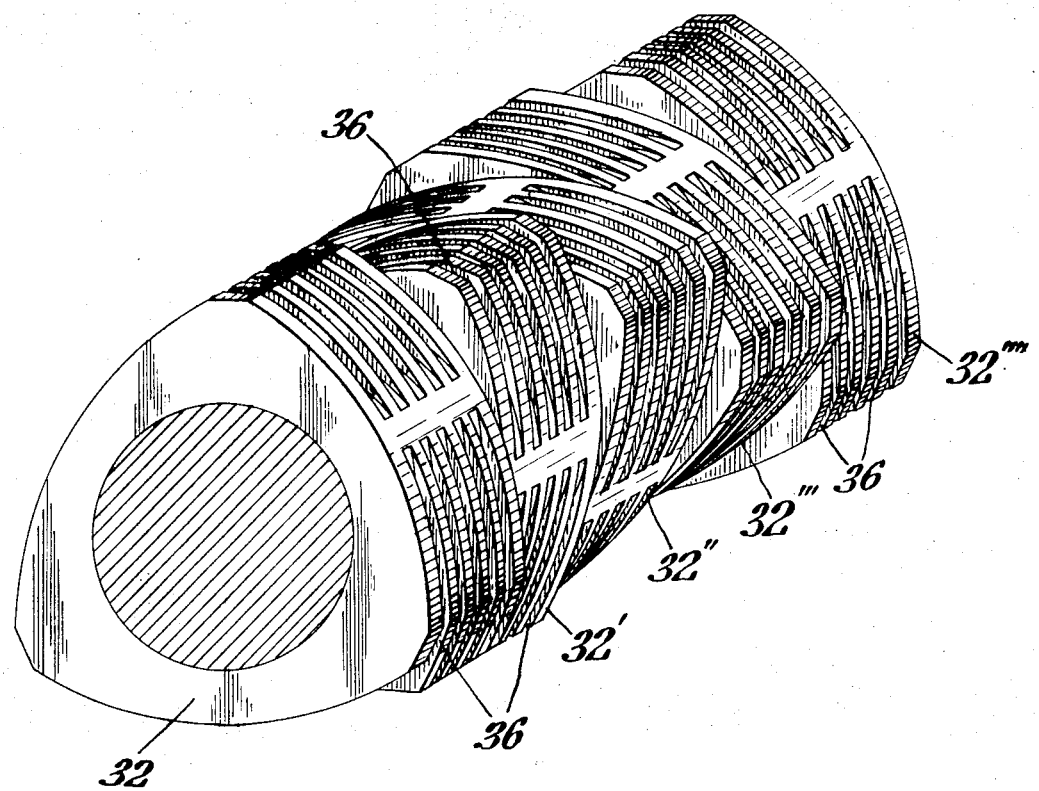
FIG. 3 is a perspective view of the inventive kneading elements of one screw employed in the apparatus of FIG. 1.

In accordance with the present invention, screw extruder apparatus is provided for the fluxing and mixing of particulate thermoplastic material which comprises providing, in the kneading elements of the screw-mounted kneading section, a plurality of intermittent, substantially radial grooves each having a width smaller than the smallest dimension of the particulate thermoplastic material to be fluxed and mixed.

It has been known in the art of fluxing and mixing of particulate thermoplastic material that the kneading section of screw extruder apparatus has been unduly encumbered by the design requirement that all material being treated, i.e., both solid particulate thermoplastic material as well as already fluxed thermoplastic material, be continuously subjected to the full kneading action.

It has been discovered possible to separate the already fluxed component of the thermoplastic material being treated from the particulate component of the thermoplastic material in order to insure that the subsequent kneading action can be concentrated on the particulate component of thermoplastic material. This separation has been found to permit fluxing of the particulate component in a kneading section of far shorter length and in a much shorter period of time prior to mixing the fluxed particulate component with the already fluxed component.

It has been found that the provision of a plurality of intermittent, substantially radial grooves, each having a width smaller than the smallest dimension of the particulate thermoplastic material, permits an intermittent separation and by-passing of the molten thermoplastic component through the grooves, thereby enabling concentration of the kneading action on the particulate material which must be fluxed before it can be mixed with the already fluxed component of the material being treated. The high pressure developed between the walls of the extruder barrel and the kneading elements during rotation of the screws results in forcing the molten material through the plurality of intermittent grooves, passage of the particulate thermoplastic material therethrough being prevented due to the physical sizing limitation. As a result, the particulate component is kept in the high shear area where the kneading action takes place. The consequent separation and concentration on the particulate component to be kneaded permits a reduction in extruder length, extrudate temperature, and dwelling time of the material in the extruder.

It has been found that the improved kneading elements of the invention may be employed in conjunction with any rotating screw extruder known to the art which has a rotating kneading element section. In this connection, single or twin-screw extruders may be employed and the kneading elements may be of any cross-sectional shape known to the art.

When twin-screw extruders are employed, an additional advantage is obtained since the plurality of substantially radial grooves in the elements are intermittent rather than continuous, thereby enabling the maintaining of the self-cleaning and wiping action necessary for efficient operation of such extruders.

Referring specifically to the embodiment of the drawings, a twin screw extruder 10 is provided having screw means 12 and 14, respectively, and screw drive means 16 and 18, respectively. The resin to be fluxed is introduced through inlet hopper 20 at the upstream end from which point it is conveyed through the extruder.

The secondary stream for the introduction of, for example, colorant into admixture with the resin is effected by the side-feeding extruder 22 having screw means 24 and drive means 26.

The resin is normally not fluxed to any extent by the time it reaches the point at which the side-fed stream is introduced into the main extruder 10. This point is located upstream of the kneading section of extruder 10 whereupon kneading of the combined stream is effected in order to produce melting and fluxing of both stream components.

After passing through the kneading section of the main extruder 10, the completely melted and fluxed material, consisting of resin and additive (such as colorant), is discharged through the extruder 10 through outlet means 28.

Figure 2:
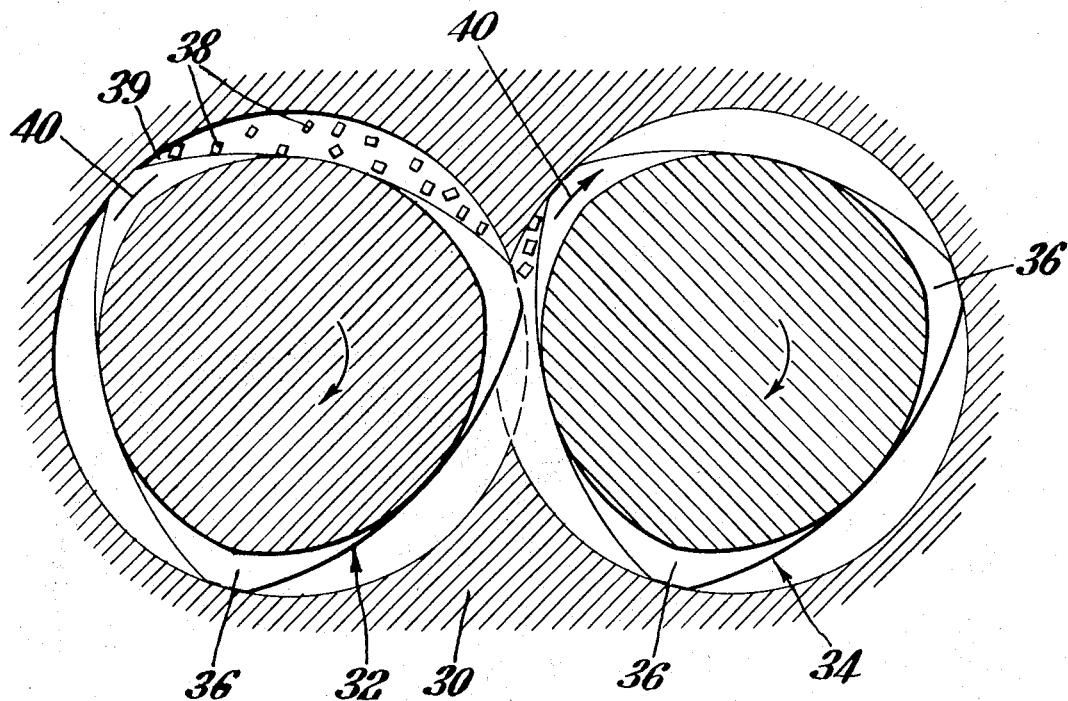
FIG. 2 is a cross-section view taken along the line 2—2 of FIG. 1, showing the interrelationship and interaction of kneading elements of the invention relative to the extruder housing.
Figure 4:
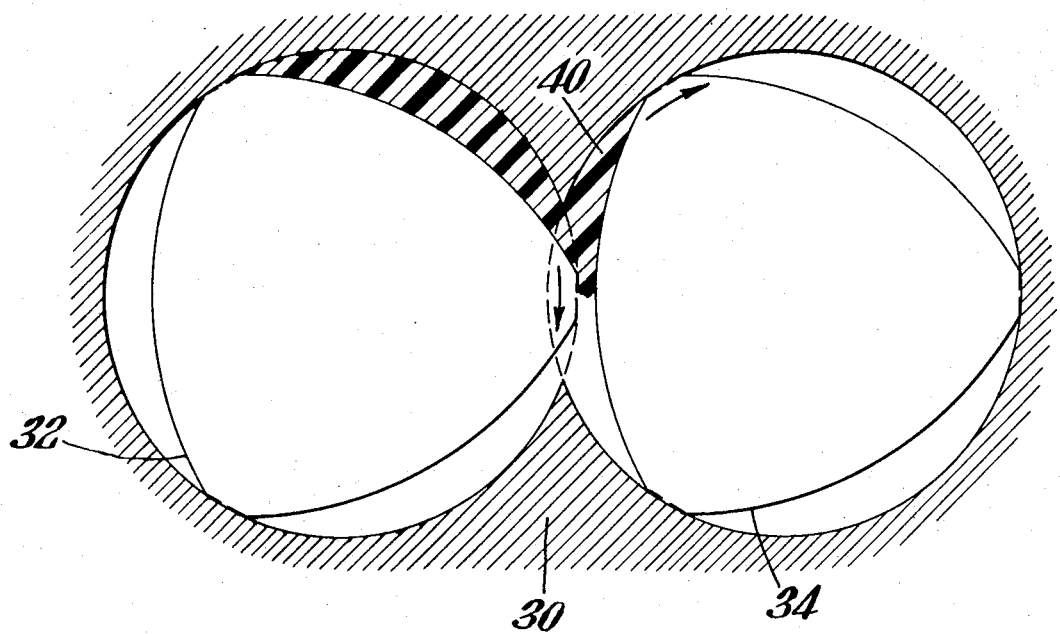
FIGS. 4, 5, 6, 7, 8, and 9 are a series of cross-sectional views similar to that of FIG. 2 showing the sequential passage of thermoplastic material being fluxed and mixed during a portion of the cycle of rotation of the twin-screw kneading section.
Figure 5:
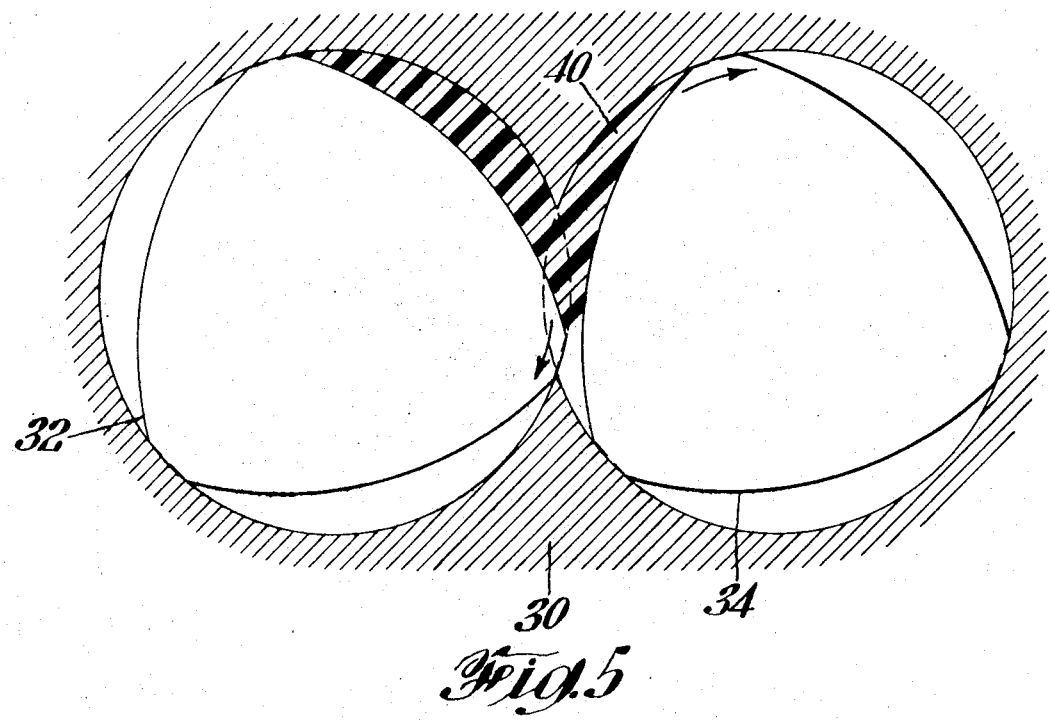
Figure 6:
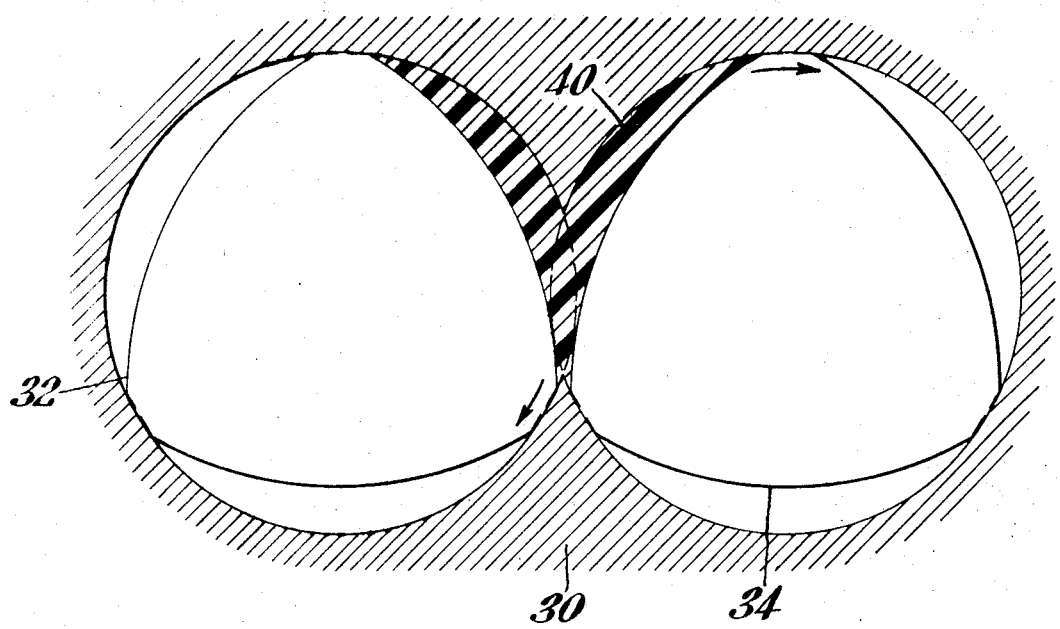
Figure 7:
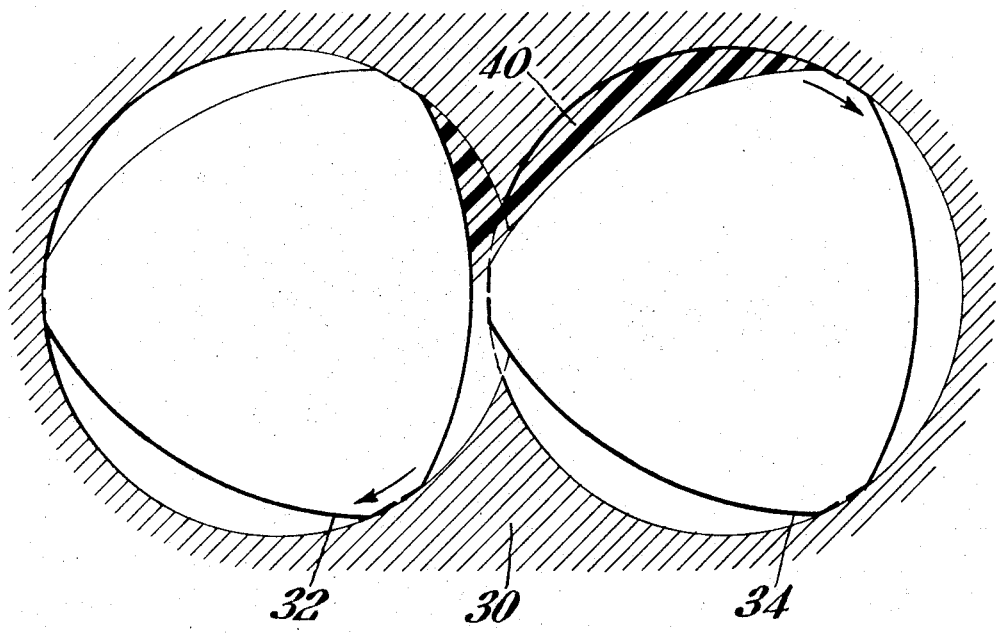
Figure 8:
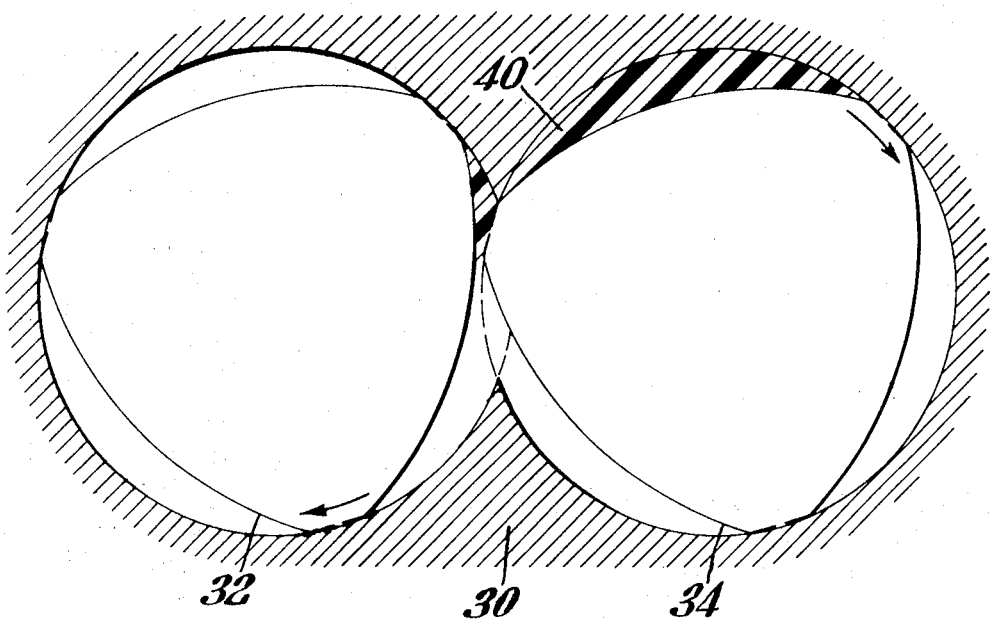
Figure 9:
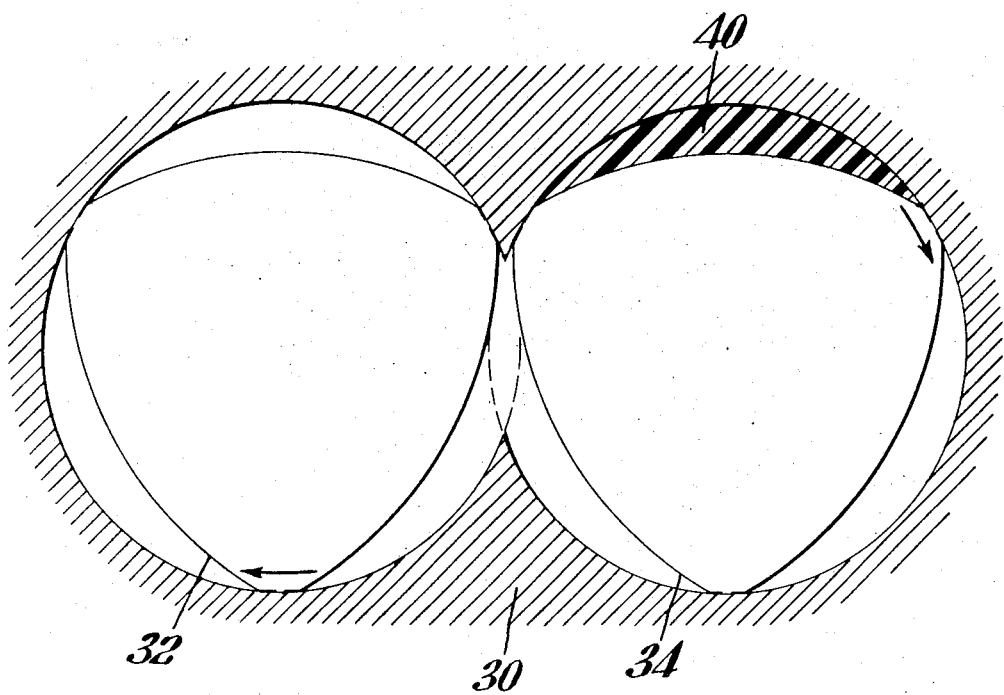

Each of the twin screws of the extruder 10, respectively containing kneading elements 32 and 34, are closely and rotatably positioned in the extruder housing 30, as shown in FIG. 2. The kneading elements comprise a plurality of similarly curved, generally triangular discs which are successively radially oriented from each other along the length of each of the twin screws. The positioning is such as to provide co-rotation of the kneading elements of each screw with the interaction of such elements. This is desirable in order to permit attainment of a self-wiping action between the twin screws, as is commonly employed in co-rotation twin screw extruders of the prior art.

Each kneading disc is provided with an aligned group (three as shown) of intermittent substantially radial grooves 36, each of such grooves having a width smaller than the smallest dimension of particulate thermoplastic material to be fluxed and mixed. The narrow width of grooves 36 prevents the entry of particulate component of thermoplastic material 38 into the grooves and maintains this component in the space 39 between the rotating kneading elements 32 and 34 and the walls of extruder housing 30. The provision of the intermittent grooves permits the flow of the molten component of the material to be treated as shown at 40 in FIG. 2 of the drawings.

As shown in separated, 3 of the drawings, the individual kneading elements mounted on one of the twin screws (32, 32', 32'', 32''', 32'''' as shown) are radially oriented in accordance with conventional practice and are each provided with three aligned groups of angularly separated intermittent grooves.

As shown in the drawings, the plurality of intermittent grooves of the kneading elements vary in radial depth from one curved triangular side of the kneading element to a maximum and then to the next curved triangular side of the kneading element. It should be pointed out that the maximum depth of such grooves controls the degree of melt flow through the grooves, rather than through the space or clearance 39 between the sides of the kneading elements and the walls of house 30.

As may be seen from the sequential showing of FIGS. 4 through 9, the flow of material through the kneading section is effected by the relative co-rotation of kneading elements 32 and 34 to pass the material through the moving clearance space or region 39 which acts to progressively carry the material through the kneading section in a manner which has been sequentially and incrementally shown for one interface relationship of a curved triangular surface of kneading element 32 with a curved triangular surface of kneading element 34 in each of these Figs.

In an example of the present invention, employing apparatus of the type shown in the embodiment of the drawings, 500 lbs. per hour of polystyrene was compounded in a 2-inch co-rotating, intermeshing, twin-screw extruder using a 12-inch long kneading section composed of 2C individual kneading elements. Each disc bore three groups of five one-sixteenth inch wide grooves. The twin screws were driven at a speed of 300 rpm and the particulate polystyrene resin introduced had the dimension of one-eighth inch diameter and one-eighth inch length cylinders. Molten master batch colorant was introduced into a side opening of extruder 10, the over-all length of extruder 10 being 50 inches. It was found that the homogeneous product discharged through the outlet 28 of the extruder was a uniformly colored, molten polystyrene resin.

A comparative operation was carried out in an otherwise identical extruder employing prior art kneading elements not having the grooves of the present invention under otherwise identical process conditions. The product obtained in carrying out such comparative operation was analyzed and it was found that 75 percent of the resin particles were unmelted after passing through the extruder.

What is claimed is:

1. In screw extruder apparatus for the fluxing and mixing of particulate thermoplastic material, employing a kneading section, the improvement which comprises providing, in the kneading elements which comprise the screw-mounted portion of the kneading section, a plurality of angularly-separated intermittent, substantially-radial grooves each having a width smaller than the smallest dimension of said particulate thermoplastic material to be fluxed and mixed.

2. Apparatus in accordance with claim 1, wherein said extruder is a twin-screw extruder.

3. Apparatus in accordance with claim 2, wherein said twinascrew extruder has a kneading section comprising a plurality of co-rotating kneading elements having a generally curved, triangular cross-section.

4. Apparatus in accordance with claim 3, wherein said plurality of intermittent grooves in said kneading elements vary in radial depth to a maximum at the center of the grooves.

5. Apparatus in accordance with claim 4, wherein each of said kneading elements of generally curved, triangular cross-section contains three angularly aligned groups of said grooves.

* * * * *